United States Patent Office 3,304,058
Patented Feb. 14, 1967

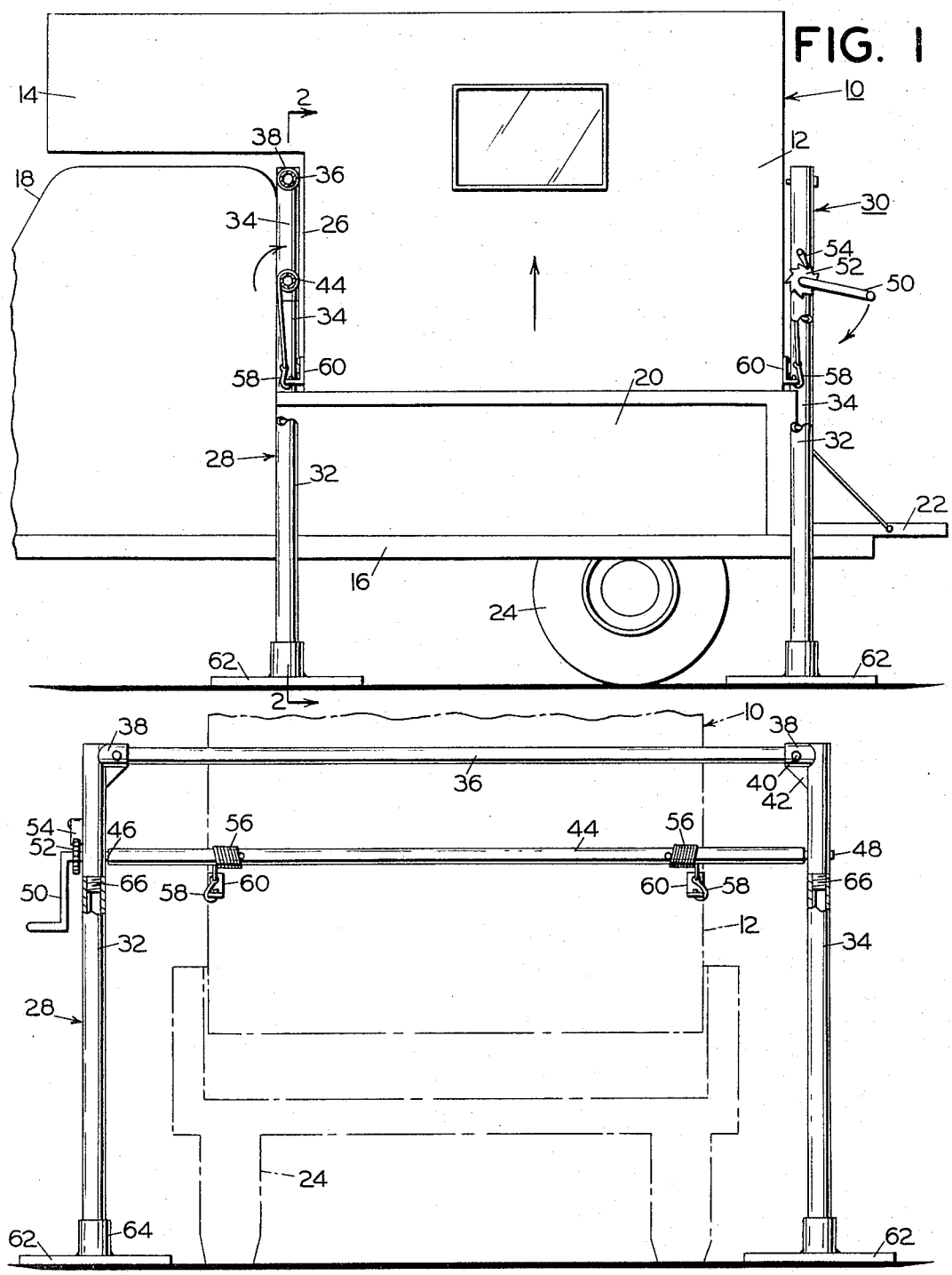

3,304,058
WINCH FOR INSTALLING AND REMOVING
CAMPER HOUSINGS
Joseph Cheadle, Weatherly Bldg.,
Portland, Oreg. 97214
Filed Jan. 25, 1965, Ser. No. 427,817
2 Claims. (Cl. 254—47)

The invention relates to new and useful improvements in which constructions of the type arranged to mount and demount a camper housing with relation to a transporting vehicle such as a pickup-type truck.

A primary objective of the present invention is to provide a winch, for mounting and demounting a camper housing with relation to a vehicle, which is simplified in construction and which facilitates convenient mounting and demounting of such a camper housing.

A more particular object is to provide a winch of the type described which utilizes independent end frames each including winch drum means, such structure facilitating a novel and convenient connection to the camper housing.

Still another object is to provide a winch of the type described which employs independent end frames and winch drum means associated therewith, and including removable post portions on one of the end frames facilitating insertion and removal of said one end frame between a forward end of a camper housing and its transporting vehicle.

Briefly stated, the present invention is intended for use in the installation and removal of camper housings with relation to their transporting vehicles. Such invention comprises a winch employing a pair of independent end frames each of which supports a winch drum for operative connection to opposite ends of a camper housing. Connected to the winch drums are hoisting lines arranged to be connected to the camper housing for lifting and lowering the same or for supporting it in an elevated non-use position. Importantly, each of the end frames employs a pair of parallel end posts supporting the respective winch drums and being spaced sufficiently so as to be laterally disposed on opposite sides of the vehicle. Importantly also, the front end frame has removable post portions which facilitate insertion and removal of said front end frame with relation to the vehicle and camper housing.

The invention will be better understood and additional objects will become apparent from the following specification and claims, considered together with the accompanying drawings, wherein the numerals of reference indicate like parts.

In the drawings:
FIGURE 1 is a side elevational view of the winch of the present invention and showing it in association with a camper housing and transporting vehicle; and
FIGURE 2 is an elevational view of a front end frame of the winch.

Referring in particular to the drawings, the numeral 10 designates a camper housing of conventional construction, having a main body portion 12 and an upper forwardly projecting sleeping compartment 14. Such a camper housing is adapted to be mounted on a pickup-type truck 16 of conventional construction, having a cab 18, a box portion 20, a tail gate 22, and supporting wheels 24.

The main body portion 12 of the camper housing is adapted to be seated in the box portion 20 of the truck with the sleeping compartment 14 projecting over the top of the cab 18. A space 26 is provided between the front end of the main body portion 12 and the rear of the cab 18, this space facilitating use of the present winch in its connection to the camper housing for mounting and demounting the same with relation to the truck 16.

The winch comprises two end frames 28 and 30 of substantially indentical construction. Each end frame comprises a pair of upright, parallel posts or standards 32 and 34 interconnected at their upper ends by a cross member 36. In a preferred construction, the upper ends of the posts 32 and 34 have integral sockets 38 for receiving the ends of the cross members 36 and a connection is established between the ends of the cross member and the sockets by pins 40. Reinforcing webs 42 are located between the sockets 38 and their respective posts to provide a rigid structure.

Each of the end frames 28 and 30 has a horizontal winch drum or shaft 44 rotatably supported thereon. Such rotatable support is accomplished by end stub shafts 46 and 48 on the drum journaled in the posts 32 and 34. The parts are dimensioned and arranged such that the winch drums 44 are supported in a plane considerably higher than the top of the vehicle box 20 in order that such drums may be capable of lifting the camper housing a selected distance above the box 20 to clear the camper housing from the vehicle.

Shafts 46 project through the posts 32 and terminate in or are otherwise connected to cranks 50. Also, these shafts have ratchet wheels 52 integrated therewith which are controlled in their operation by pawls 54 pivotally mounted on the posts 32. Shafts 46 are integrated with the drums 44 to have unitary rotation therewith.

Connected for winding relation to each of the winch drums 44 is a pair of hoisting lines 56. The free ends of these lines have hooks 58 attached thereto, and these hooks are arranged for connection to eyes or lugs 60 secured in a suitable manner to front and rear surfaces of the camper housing.

Foot plates 62 are provided for each of the posts 32 and 34 of the end frames to provide a stable support of the winch frames on a supporting surface. The interconnection between the posts and the foot plates is accomplished by means of upright sockets 64 integrated with the foot plates and adapted to receive the bottom ends of said posts. The foot plates 62 may be removably connected to the posts, such removable connection comprising simply a free socket fit between the sockets 64 and said posts.

In a preferred construction, each of the posts 32 and 34 of the front end frame 28 comprises two parts which are detachably connected by a threaded joint 66. Such provides means for separating the lower portion of the posts from the upper portion of the frame to facilitate insertion and removal of the front end frame with relation to the camper housing and the truck. The joints 66 are located just below the points of journaled engagement of the drum 44 with the posts.

In describing the operation of the present winch, it will be assumed that a camper housing is supported on the truck and that it is desired to remove the said housing. The rear end frame 30 is positioned adjacent the rear of the camper housing and truck as shown in FIGURE 1 and the front end frame is inserted in the space 26 between the cab 18 and the camper housing. In order to insert the end frame 28 in the space 26 the lower portions of the posts 32 and 34 of this frame are detached from the upper portions. The frame is thus readily inserted in the space 26 whereupon the lower portions of the posts are reinstalled on the frame to support the latter in a vertical lifting position. The foot plates 62 on the front end frame may or may not be removed at this time but if temporarily removed would ease the handling of the lower portions of the posts in attaching them to the upper portion of the frame.

The hoisting lines 56 are then connected to the eyes 60 on the camper housing and the cranks 50 operated to lift the housing upwardly to a position of clearance with relation to the box 20 of the vehicle. The vehicle may then be driven out from under the camper housing. Such housing may be supported on the winch assembly in this elevated position until such time that it is to be remounted on the truck.

For lowering the camper housing onto the truck, the cranks are rotated, after first releasing the pawls 54 from the ratchets, in their reverse direction. The front frame is removed by disconnecting the hooks 58 and unscrewing the lower portions of the posts from the upper frame portion. The upper frame portion is then pulled out of the space 26. The rear end frame 30 is freed from the camper housing merely by disconnecting its hooks 58.

The present invention thus provides a simplified winch assembly for mounting and demounting a camper housing on a vehicle. It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A winch assembly for installing and removing a camper housing which is separable from a vehicle and which is of a type having a main body portion arranged to ride on a vehicle bed in rearwardly spaced relation from the cab of the vehicle and also having an upper, forwardly projecting portion: comprising a pair of end frames one of which is arranged to be disposed adjacent the front end of a camper housing and the other of which is arranged to be disposed adjacent the rearward end of the camper housing, said front frame comprising an upper portion arranged to extend laterally through the space between the camper housing and the cab of the vehicle, winch means mounted on the upper portion of said front frame and arranged for connection to the camper housing for raising and lowering the latter upon operation of the winch means, and a pair of posts on each side of said front frame for supporting the upper portion of the latter in the space between the camper housing and the cab, one of said posts being detachably connected to the upper portion of said front frame to facilitate insertion of said upper portion into the space between the camper housing and the cab.

2. A winch for installing and removing a camper housing which is separable from a vehicle and which is of a type having a main body portion arranged to ride on a vehicle bed in rearwardly spaced relation from the cab of the vehicle and also having an upper, forwardly projecting portion: comprising a pair of end frames one of which is arranged to be disposed adjacent the front end of a camper housing and the other of which is arranged to be disposed adjacent the rear end of a camper housing, said front frame comprising an upper portion arranged to extend laterally through the space between the camper housing and the cab of the vehicle, a winch drum rotatably mounted on said rear frame, a winch drum rotatably mounted on the said upper portion of said front frame, means for operating said winch drums, a pair of lifting lines, one end of said lines being connected to respective ones of said drums and the other ends of said lines being arranged to be connected to respective ends of a camper housing for lifting and lowering the camper housing upon rotative operation of said winch drums, and a pair of posts on each side of said end frame supporting them on the ground, the posts on said front frame being of a height to support the said upper portion thereof in the space between the camper housing and the cab, at least one of said posts being detachably connected to the upper portion of said front frame to facilitate insertion of said upper portion into the space between the camper housing and the cab.

References Cited by the Examiner

UNITED STATES PATENTS

| | | | |
|---|---|---|---|
| 391,723 | 10/1888 | Stone | 254—47 |
| 449,026 | 3/1891 | Anderson. | |
| 1,352,035 | 9/1920 | Smith | 254—145 |
| 1,355,690 | 10/1920 | Rasmussen | 254—144 |
| 1,484,389 | 2/1924 | Folkers | 254—47 |
| 3,139,266 | 6/1964 | Tew | 254—47 |
| 3,158,354 | 11/1964 | Ward | 254—47 |

WILLIAM FELDMAN, Primary Examiner.

M. C. MEHR, Assistant Examiner.